XR 3,041,556

June 26, 1962 A. H. MEITZLER 3,041,556

ULTRASONIC STRIP DELAY LINE

Filed July 1, 1959 4 Sheets-Sheet 1

INVENTOR
A. H. MEITZLER
BY
John K. Mullarney
ATTORNEY

3041556

INVENTOR
A. H. MEITZLER
BY John K. Mullarney
ATTORNEY

INVENTOR
A. H. MEITZLER
BY John K. Mullarney
ATTORNEY

June 26, 1962 A. H. MEITZLER 3,041,556

ULTRASONIC STRIP DELAY LINE

Filed July 1, 1959 4 Sheets-Sheet 4

INVENTOR
A. H. MEITZLER

BY John K. Mullarney

ATTORNEY

United States Patent Office 3,041,556

Patented June 26, 1962

3,041,556

ULTRASONIC STRIP DELAY LINE

Allen H. Meitzler, Morristown, N.J., assignor to Bell Telephone Laboratories, Incorporated, New York, N.Y., a corporation of New York Filed July 1, 1959, Ser. No. 824,437

10 Claims. (Cl. 333—30)

This invention relates to delay devices, and more particularly to solid ultrasonic delay lines.

Solid ultrasonic delay lines are used in a variety of applications when it is necessary to delay or store pulses over periods ranging from 10 to 10,000 microseconds. Such applications include M.T.I. radar systems, computer memories and electric switching systems.

In general, the delay lines are designed to operate in one of two different conditions of pulse propagation. In one condition, the line is used to propagate pulses without, or, more accurately, with a minimum of dispersion and in the other condition with dispersion. The term dispersion refers to the delay versus frequency characteristics of a delay line. If the delay is constant, or nearly so, for all frequencies, the line is said to be "nondispersive" and if the delay changes with frequency the line is termed "dispersive."

Most present day applications require lines having little or no dispersion in the wave propagation through the line. The most widely used form of delay medium for providing the same comprises a disk of fused quartz approximately 5/16 inch thick. The beam is made to follow a folded path in the disk by means of specially oriented reflecting facets. These facets are ground around the edge of the disk in such a manner that the beam initiated by the input transducer on one of the facets travels back and forth across the diameter, by means of successive reflections from the facets, until it finally arrives at the facet holding the output transducer. In this type of line, a shear wave motion is used that is polarized perpendicular to the major surfaces of the disk and parallel to the plane surfaces of the reflecting facets.

The polygonal or disk-like delay lines require as many as fifteen or more accurately ground facets. And, unfortunately, the grinding of the facets in both a time consuming and an extremely expensive procedure. Furthermore, the positions of these facets are so interrelated that any error in grinding one facet may entirely destroy the usefulness of the delay line.

As an alternative, small diameter wires have been used as the delay media for the transmission of torsional waves. This arrangement provides satisfactory nondispersive, pulse propagation. However, while the wire itself is readily fabricated the torsional mode transducers, which are required, are not.

Accordingly, it is an object of the present invention to provide a nondispersive delay line that is simple and economical to fabricate.

For certain applications, it is desirable to have a dispersive mode of propagation. However, with some of the pre-existing ultrasonic delay lines, e.g., the aforementioned torsional wire line, it is difficult, if not impossible, to achieve dispersive propagation.

With those type lines in which dispersive mode propagation is possible, many dispersive modes are generally capable of being supported. The first dispersive mode is the one most frequently utilized, but the second and higher dispersive modes are sometimes employed at the higher carrier frequencies. However, regardless of the mode to be propagated, it is desirable that the input electrical energy be converted, as much as possible, into the elastic wave motion corresponding to the preferred mode of propagation and that there be no conversion from said preferred mode to another as the energy propagates down the line. Conversion into any other mode is, of course, inefficient insofar as it results in the removal of some of the energy from said preferred mode. Further, such conversion results in spurious signals which can cause errors in the system with which the delay line is to be used.

Dispersive mode propagation is not readily or efficiently achieved with the aforementioned polygonal, disk-type delay line. Ultrasonic delay lines using longitudinal compressional waves in rods, slabs or plates are known to be capable of supporting dispersive mode propagation, but these, for the most part, suffer from excessive conversion of the energy to unwanted modes.

It is therefore a further object of the present invention to provide a dispersive delay line of high efficiency and a minimum of unwanted mode conversion.

Other objects of the invention are to reduce the level of spurious signals in ultrasonic delay lines and to improve the efficiency, reduce the cost and improve the transmission characteristics of such lines.

In accordance with the present invention, these and other objects are realized in a delay line having the form of an elongated thin strip whose width dimension is approximately ten or more times that of the thickness dimension. Thickness-shear mode transducers are used to generate an elastic shear wave motion in the delay medium. In this wave motion the individual particles in the strip move perpendicular to the length axis and the minor surfaces of the strip. The major surfaces of the strip guide the elastic wave motion in particular modes of propagation that do not lose energy as a result of reflections from said major surfaces. By suitable choice of delay line geometry and transducer arrangement, it is possible to obtain dispersive or nondispersive propagation characteristic.

In one specific embodiment of the invention, nondispersive propagation is achieved by making the strip thin enough ($<\lambda/2$) that the high frequency limit of the desired passband is something less than the cut-off frequency of the lowest dispersive mode. This arrangement permits energy to propagate without rapid attenuation only in the nondispersive, zeroth mode. The width dimension of this strip is of the order of ten or more wavelengths.

In another embodiment of the invention, satisfactory propagation in the first dispersive mode is achieved by making the strip thickness somewhat greater than a half wavelength at the low frequency limit of the desired passband and less than one wavelength at the high frequency limit of said passband. At the cut-off frequency in the first dispersive mode, the thickness of the strip is equal to a half wavelength and at the cut-off frequency in the second dispersive mode, the thickness of the strip is equal to one wavelength. Accordingly, energy is propagated without rapid attenuation in the first dispersive mode but not in the second or high dispersive modes.

In addition, the establishment of a preferred dispersive mode is furthered by bevelling the end faces of the strip at a predetermined angle.

In accordance with a further feature of the invention, the minor surfaces and adjacent portions of the major surfaces of the strip delay line are coated or covered with absorbers such as adhesive tape. This significantly reduces the amount of energy reflections and unwanted mode conversion.

These and other objects and features of the invention may be better understood by a consideration of the following detailed description when read in connection with the drawings in which.

Figure 1:
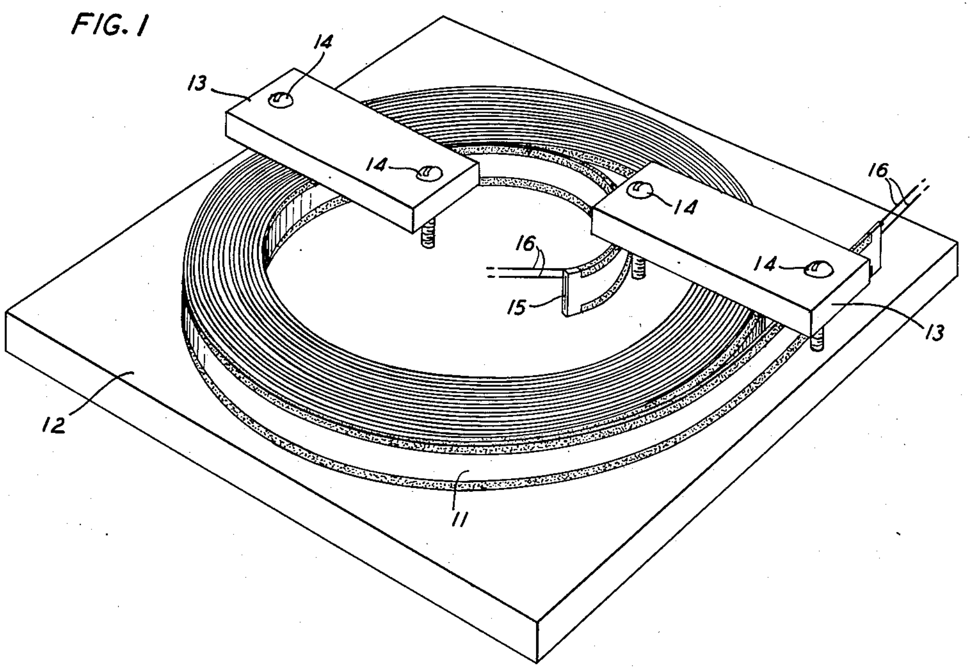
FIG. 1 is a perspective view of a delay line system incorporating the principles of the present invention.

Referring now to the drawings and particularly to FIG. 1, the strip delay line 11 is wound into a flat spiral so as to constitute a compact package. To prevent loss of energy, the line should be wound with a slight spacing between adjacent major surfaces. The line is rigidly clamped between the baseboard 12 and two or more rectangular blocks 13 by tightening up on the bolts or screws 14. As will be explained hereinafter, the minor surfaces are dead surfaces and thus the line can be clamped in the described fashion without loss of energy. Transducers 15 are bonded to the end faces of the strip by conventional techniques. A pair of wires 16 are connected to each of the transducers whereby one of the latter serves as the signal input to, and the other as the output from, the delay line. As will be clear to those in the art, the electrical and physical connections at each of the ends of the line are similar and therefore either transducer can be used as the output or input.

Figure 2:
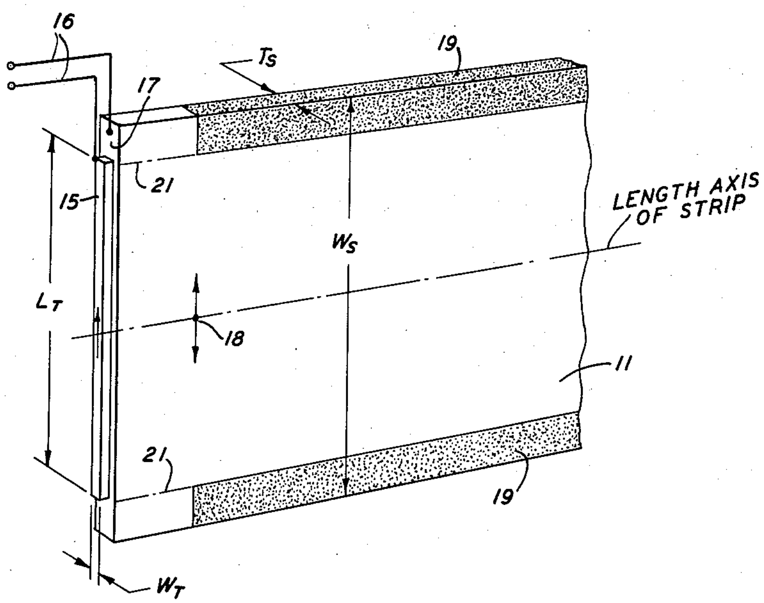
FIG. 2 is an enlarged fragmentary view of the input end of a nondispersive delay line constructed in accordance with the present invention.

In FIG. 2 there is shown an enlarged view of the input end of a nondispersive delay line. As indicated, the delay medium 11 is in the form of a strip having a width dimension, $W_s$, substantially greater than the thickness dimension, $T_s$. Ideally, the delay medium should be an isotropic material, such as glass or vitreous silica, but polycrystalline materials such as ordinary metallic alloys (e.g., aluminum alloy, 5052–H32, having 95–97 percent aluminum, 2 percent magnesium, 0.2 percent chromium) have proven satisfactory provided grain size is sufficiently small compared to the wavelength of the elastic wave motion carried by the strip.

A thickness-shear mode transducer 15, such as a Y-cut piezoelectric crystal or a thickness-shear mode $BaTiO_3$ ceramic transducer, is bonded to the end face 17 of the strip using standard techniques. The transducers are of simple geometrical form thus permitting relative ease in cutting to final size and in poling and bonding. The arrow on the transducer 15 indicates the desired direction of poling or polarization thereof. It is perpendicular to the length axis and the minor surfaces of the strip. Accordingly, when the transducer is excited by an alternating voltage applied to the electroded areas of the major surfaces, a thickness-shear vibration is induced therein. This vibration in turn produces an elastic shear wave motion in the strip. As indicated in FIG. 2, in this wave motion each individual particle 18 in the strip moves perpendicular to the length axis and parallel to the direction of polarization in the transducer.

With the shear wave particle motion parallel to the major surfaces of the strip, no energy is lost and no mode conversion takes place as a result of reflections from said major surfaces. However, shear wave motion in any other orientation would result in energy loss and mode conversion.

The major surfaces of the strip guide the elastic wave motion as the same propagates down the line. When the propagated energy reaches the transducer at the opposite end, a thickness-shear vibration is induced in the latter and converted by the transducer to electrical energy.

As will be discussed more fully hereinafter, this geometry of the delay medium can support many modes of shear wave motion. The lowest or zeroth mode is nondispersive throughout the entire frequency spectrum. The higher modes are all dispersive, each with its own cut-off frequency. At the cut-off frequency in the first dispersive mode of propagation, the thickness of the strip, $T_s$, is equal to a half wavelength. And, the cut-off frequencies of the higher dispersive modes are integral multiples of the cutoff frequency for the lowest dispersive mode. It is, accordingly, possible to operate a strip delay line in two different conditions of pulse propagation, namely, with or without dispersion.

To propagate pulses without dispersion, the line is designed in the following way. The strip is made thin enough (less than a half wavelength) that the high frequency limit of the desired passband is less than the cut-off frequency in the first dispersive mode. In this manner, dispersive mode propagation is prevented. This is more clearly illustrated in FIG. 3 of the drawings which shows typical time delay versus frequency characteristics for the zeroth or nondispersive mode and the first dispersive mode. As indicated, the time delay for the zeroth mode remains constant for all frequencies and the most favorable range of operation for this mode lies below the cut-off frequency of the lowest or first dispersive mode.

The reflections of the wave motion from the minor surfaces of the strip result in energy loss, unwanted mode conversion, and the production of spurious signals. The effects of the undesirable interactions of the main elastic wave motion with the minor surfaces are reduced, however, in accordance with the invention, in two ways. First, the dimensions $W_s$ and $L_t$ are made large relative to a wavelength. That is, the line is designed so that $L_t$ (length of transducer) is of the order of ten or more wavelengths at the low frequency limit of the desired passband. This ensures an almost pure thickness-shear vibration in the transducer itself and, further, provides a radiated beam having an extremely narrow main lobe. The dimension $W_s$ is made larger than $L_t$ so as to aid in keeping the main portion of the beam away from the minor surfaces. The extent that $W_s$ exceeds $L_t$ is not critical.

To further reduce the aforementioned undesirable interaction of the main elastic wave motion with the minor surfaces, the boundary conditions at said minor surfaces are altered. This is accomplished, in accordance with the invention, by coating or covering the minor surfaces as well as the adjacent major surfaces with absorbers 19. The absorber material preferably comprises an adhesive with a cloth or plastic type backing. The use of absorber material along the minor surfaces of the strip is not by itself sufficient. It is only when said absorber material is also placed on each of the major surfaces adjacent said minor surfaces that significant reduction in said interactions is obtained. This is partly explainable on the basis that placing the absorber material along the major as well as minor surfaces increases the total opportunity for interaction between the absorbent and the beam incident upon the minor surfaces.

As illustrated in FIG. 2 of the drawings, the absorber material should extend inwardly, along the major surfaces, no further than the lines 21 which are drawn from the ends of the transducer 15. Any further inward extension results in excessive absorption of the energy of the main beam. Also, to prevent unnecessary energy absorption, the absorber material should not extend, longitudinally, to the very ends of the delay line but should terminate a short distance therefrom. This distance is not critical.

Since the minor surfaces, treated in the above-described fashion, are dead surfaces, the line may be rigidly clamped anywhere along its length, as shown in FIG. 1, without loss of energy. This greatly simplifies the problem of packaging the delay line.

Figure 4:
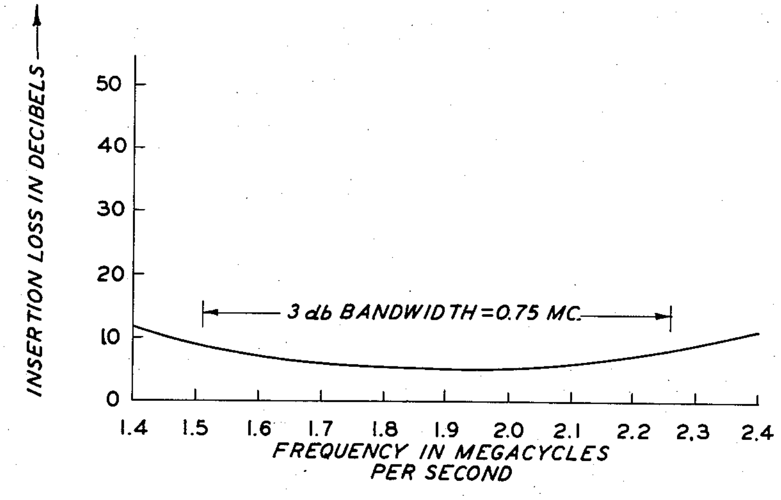
FIG. 4 shows the transmission characteristics of a typical nondispersive strip delay line.

FIG. 4 shows the transmission characteristics of a typical nondispersive strip delay line having a delay time of approximately 200 microseconds. The delay medium was commercial aluminum alloy, 5052–H32, having an ordinary rolling-mill finish. The arrangement of the transducers on the end faces and of the absorber along the edges were similar to that shown in FIG. 2. The dimensions of the strip and of the transducers were as follows:

| | Inches |
|---|---|
| Strip length ($L_s$) | 25.0 |
| Strip width ($W_s$) | 0.75 |
| Strip thickness ($T_s$) | 0.025 |
| Transducer length ($L_t$) | 0.700 |
| Transducer width ($W_t$) | 0.025 |
| Transducer thickness ($T_t$) | 0.0307 |

The line exhibited exceptional bandpass characteristics. As indicated, with a midband frequency of 1.85 megacycles and a 3 db bandwidth of 0.75 megacycle, the fractional bandwidth is 41 percent. At the midband frequency, there was a 45 db separation between the level of the main signal and that of the largest spurious signal.

Figure 3:
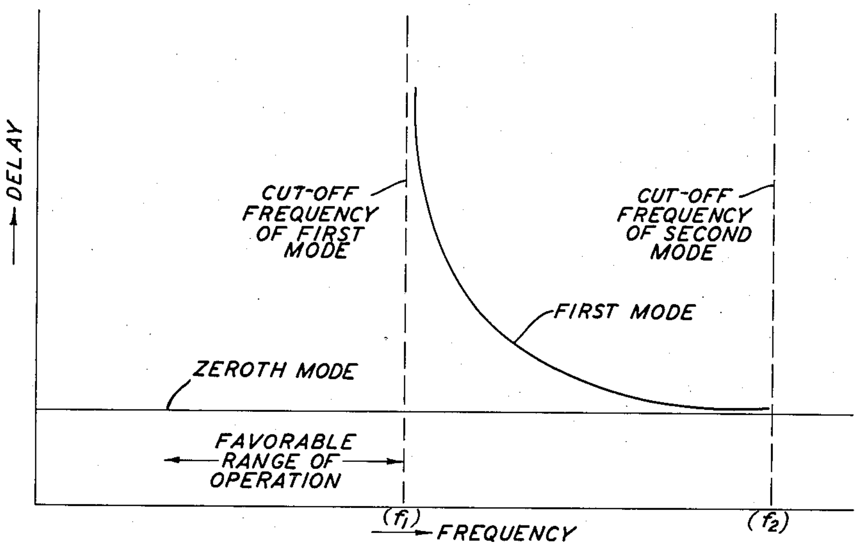
FIG. 3 is a time delay versus frequency graph which is useful in explaining the design of the delay lines of the invention.

The establishment of a dispersive mode of propagation in a strip requires that the frequency of the input signal be greater than the cut-off frequency for that particular mode. Thus, as shown in FIG. 3, for propagation in the first dispersive mode, the input frequency must be greater than the first dispersive mode, cut-off frequency ($f_1$). Further, the input frequency should preferably be something less than the cut-off frequency ($f_2$) for the second dispersive mode. In this manner, energy will be propagated without rapid attenuation in the first but not in the second dispersive mode, the frequency of the input signal should be greater than the second dispersive mode cut-off frequency, but less than the third dispersive mode cut-off frequency, and so on.

The mathematics of propagation in elastic, as well as electromagnetic, guides has received extensive treatment; see, for example, "Transverse Waves in Elastic Plates" by V. T. Buchwald, Quarterly Journal of Mechanics and Applied Math, volume II, Part 4, pages 498–512, November 1958. From the general equations which have been developed heretofore, one can derive, for the disclosed delay medium geometry, an expression for the cut-off frequencies for the various modes. These frequencies are given by the equation:

$$f_{cn}=\frac{nV_s}{2T_s} \quad (1)$$

where $f_{cn}$ is the cut-off frequency for the $n$th mode, $T_s$ is strip thickness and $V_s$ is the "free-space" velocity of shear waves in the delay medium and is equal to $(\mu/\rho)^{1/2}$, where $\mu$ is the shear modulus and $\rho$ is the density.

Since the velocity ($V_s$) is, of course, equal to the product of frequency and wavelength, the strip thickness for the various cut-off frequencies can be readily obtained. At the cut-off frequency in the first dispersive mode, strip thickness is equal to a half wavelength ($T_s=\lambda/2$). For the second dispersive mode ($T_s=\lambda$), for the third dispersive mode ($T_s=3\lambda/2$), and so on. Accordingly, to operate over a given passband and in the first dispersive mode, the thickness of the strip must be more than a half wavelength at the low frequency limit of said passband and should be less than one wavelength at the high frequency limit of said passband. And for operation in the second dispersive mode, the thickness of the strip must be more than one wavelength at the low frequency limit of the passband and should be less than one and a half wavelengths at the high frequency limit of said passband.

The delay per unit of length is given by the equation:

$$\tau_n=\frac{1}{V_s}\left(1-\frac{f_{cn}^2}{f^2}\right)^{-1/2} \quad (2)$$

where $f$ is the frequency of the signal being propagated in the line in the $n$th mode.

Figure 5:
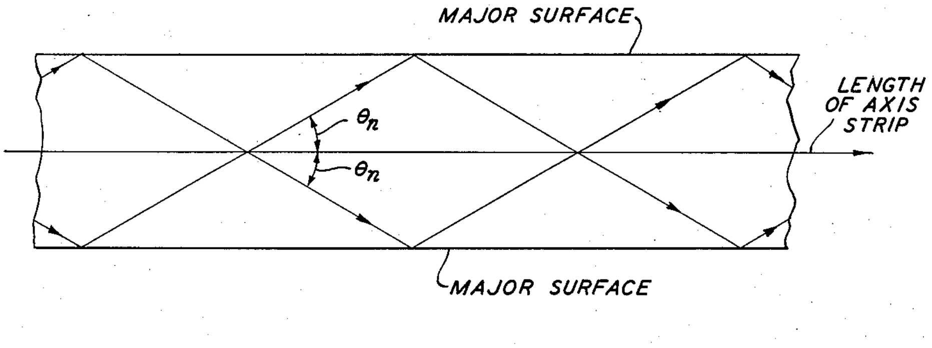
FIG. 5 is a schematic diagram illustrating the type of elastic wave motion that takes place with dispersive mode propagation.

In a dispersive mode of propagation, the total wave motion can be resolved into two wave components traveling back and forth between the major surfaces of the strip. However, as previously pointed out, with the shear wave particle motion parallel to the major surfaces, no energy is lost and no mode conversion takes place as a result of the reflections of said wave components from said major surfaces. As shown in FIG. 5, the two elementary wave components travel at an angle ($\theta_n$) with respect to the length axis of the strip. The magnitude of this angle is given by the equation:

$$\theta_n=\arctan\left(\frac{f^2}{f_{cn}^2}-1\right)^{-1/2} \quad (3)$$

As indicated, the value of $\theta$ is a function of the dispersive mode of propagation.

Figure 6A:
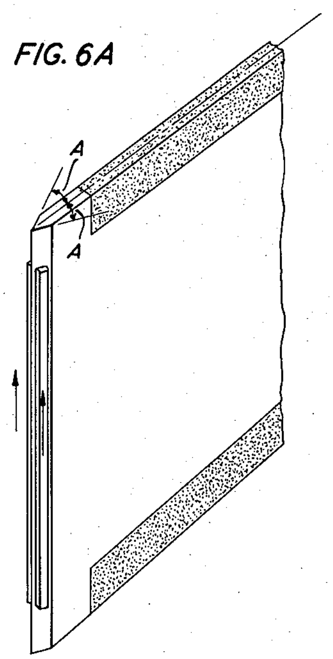
FIGS. 6A and 6B are enlarged fragmentary views of the input ends of two dispersive delay lines constructed in accordance with the invention.
Figure 6B:
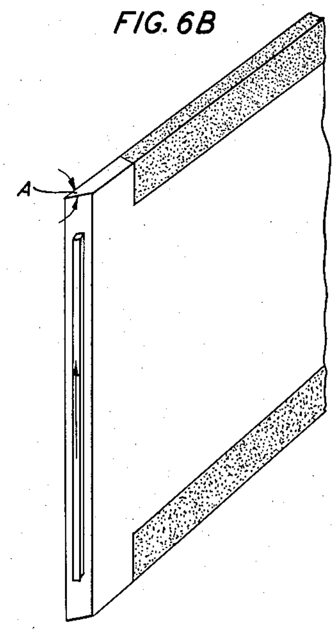

The establishment of a preferred dispersive mode of propagation is furthered, in accordance with the present invention, by bevelling the end faces of the strip at a predetermined angle. FIGS. 6A and 6B show two arrangements that have been used to initiate and receive wave motions traveling in selected dispersive modes. In other respects, e.g., transducer polarization, $W_s$ and $L_t$ dimensions, use and location of absorber material and the like, the delay lines of FIGS. 6A and 6B are the same as those shown in FIG. 2.

The angle (A) at which the end faces are bevelled is related to the angle ($\theta$) that the two wave components make with the longitudinal axis of the strip. This relationship is as follows:

$$A=\frac{\pi}{2}-\theta_n \quad (4)$$

Figure 6C:
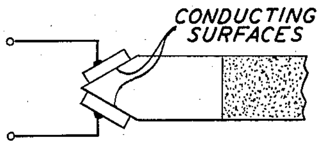
FIG. 6C is a schematic diagram of the input end of the delay line shown in FIG. 6A.

While either of the illustrated bevelled end arrangements can be used for all the dispersive modes of propagation, the double bevelled end arrangement of FIG. 6A has proven somewhat more satisfactory than the single bevelled end arrangement of FIG. 6B. FIG. 6C is a schematic diagram of the input end of the delay line of FIG. 6A showing the electrical connections thereto. The pair of transducers in this arrangement is connected in series.

While FIGS. 6A and 6B show only the input ends of the delay line, it will be clear to those skilled in the art that the output ends are similar.

Figure 7:
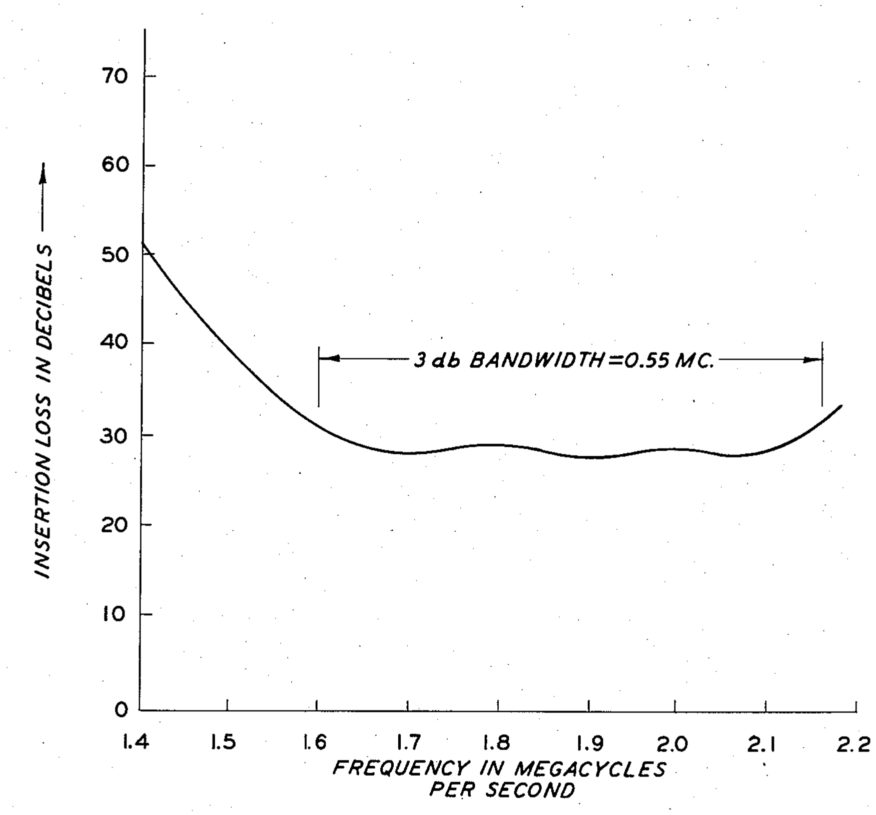
FIG. 7 shows the transmission characteristics of a typical strip delay line operating in the first dispersive mode.

FIG. 7 shows the transmission characteristics of a typical dispersive strip delay line having a delay that varied from 5800 microseconds, at a carrier frequency of 1.4 megacycles, to 4500 microseconds, at a carrier frequency of 2.2 megacycles. The single bevel end arrangement, shown in FIG. 6B, was used to propagate the energy in the first dispersive mode. The dimensions of the strip and of the transducers were as follows:

| | | |
|---|---|---|
| Strip length ($L_s$) | feet | 42.0 |
| Strip width ($W_s$) | inches | 2.50 |
| Strip thickness ($T_s$) | do | 0.052 |
| Transducer length ($L_t$) | do | 1.50 |
| Transducer width ($W_t$) | do | 0.060 |
| Transducer thickness ($T_t$) | do | 0.0341 |

As indicated in FIG. 7, with a midband frequency of 1.88 megacycles and a 3 db bandwidth of 0.56 megacycle, the fractional bandwidth amounts to 29 percent. At the midband frequency, there was approximately a 20 db separation between the level of the main signal and that of the largest spurious signal (due to zeroth mode propagation).

It is to be understood that the above-described arrangements are illustrative of the application of the principles of the invention. Numerous other arrangements may be devised by those skilled in the art without departing from the spirit and scope of the invention.

What is claimed is:

1. A delay line comprising an elongated thin strip of ultrasonic transmission material, said strip having a rectangular cross section with a width dimension many times that of the thickness dimension, thickness-shear mode transducer means mounted at one end of said strip of transmission material for generating in said strip an elastic shear wave motion in which the individual particle motion in said strip is perpendicular to the length axis and the minor surfaces of the strip, and thickness-shear mode transducer means mounted at the other end of said strip for generating electrical signals in response to the shear wave motion in the strip.

2. A delay line as defined in claim 1 wherein the width of said strip is at least ten wavelengths at the low frequency limit of the passband to be propagated through the line.

3. A delay line as defined in claim 2 wherein the thickness of said strip is less than a half wavelength at the high frequency limit of said passband.

4. A delay line as defined in claim 2 wherein the thickness of said strip is more than a half wavelength at the low frequency limit of said passband and less than one wavelength at the high frequency limit of said passband.

5. A delay line as defined in claim 2 wherein the thickness of said strip is more than one wavelength at the low frequency limit of said passband and less than one and a half wavelengths at the high frequency limit of said passband.

6. A delay line comprising an elongated thin strip of ultrasonic transmission material, said strip having a rectangular cross section with a width dimension many times that of the thickness dimension, a thickness-shear mode transducer mounted at one end of said strip of transmission material, said transducer being polarized in a direction prependicular to the length axis and the minor surfaces of said strip, means for inducing a thickness-shear vibration in said transducer, said vibration serving to produce in said strip an elastic shear wave motion in which the individual particle motion in said strip is perpendicular to the length axis of said strip and parallel to the direction of polarization in the transducer, and a second thickness-shear mode transducer mounted at the other end of said strip, said second transducer also being polarized in a direction perpendicular to the length axis and the minor surfaces of said strip, whereby electrical signals are generated by said second transducer in response to the shear wave motion in the strip.

7. A delay line as defined in claim 6 wherein the length of the transducers and the width of said strip are at least ten wavelengths at the low frequency limit of the passband to be propagated through the line.

8. A delay line as defined in claim 6 wherein the ends of said strip are bevelled at a predetermined angle with respect to the longitudinal axis and the major surfaces of said strip.

9. A dispersive delay line comprising an elongated thin strip of ultrasonic transmission material, said strip having a rectangular cross section with a width dimension of at least ten wavelengths and a thickness dimension of more than a half wavelength at the low frequency limit of the passband to be propagated through the line, thickness-shear mode transducer means mounted at one end of said strip of transmission material for generating in said strip an elastic shear wave motion in which the individual particle motion in said strip is perpendicular to the length axis and the minor surfaces of the strip, and thickness-shear mode transducer means mounted at the other end of said strip for generating electrical signals in response to the shear wave motion in the strip.

10. A delay line as defined in claim 9 wherein each of the ends of said strip are provided with a pair of bevelled surfaces each of which makes a predetermined acute angle with the longitudinal axis of the strip, and a thickness-shear mode transducer located on each of said bevelled surfaces.

References Cited in the file of this patent

UNITED STATES PATENTS

| | | |
|---|---|---|
| 2,672,590 | McSkimin | Mar. 16, 1954 |
| 2,711,515 | Mason | June 21, 1955 |
| 2,714,708 | Howatt et al. | Aug. 2, 1955 |
| 2,727,214 | McSkimin | Dec. 13, 1955 |

OTHER REFERENCES

Sutton: "Propagation of Sound in Plate-Shaped Solid Delay Lines," The Journal of The Acoustical Society of America, vol. 31, No. 1, January 1959, pages 34–43.